July 5, 1966 R. E. SUMMERER 3,259,832
ELECTRICAL CONTROL DEVICE
Filed Oct. 3, 1962
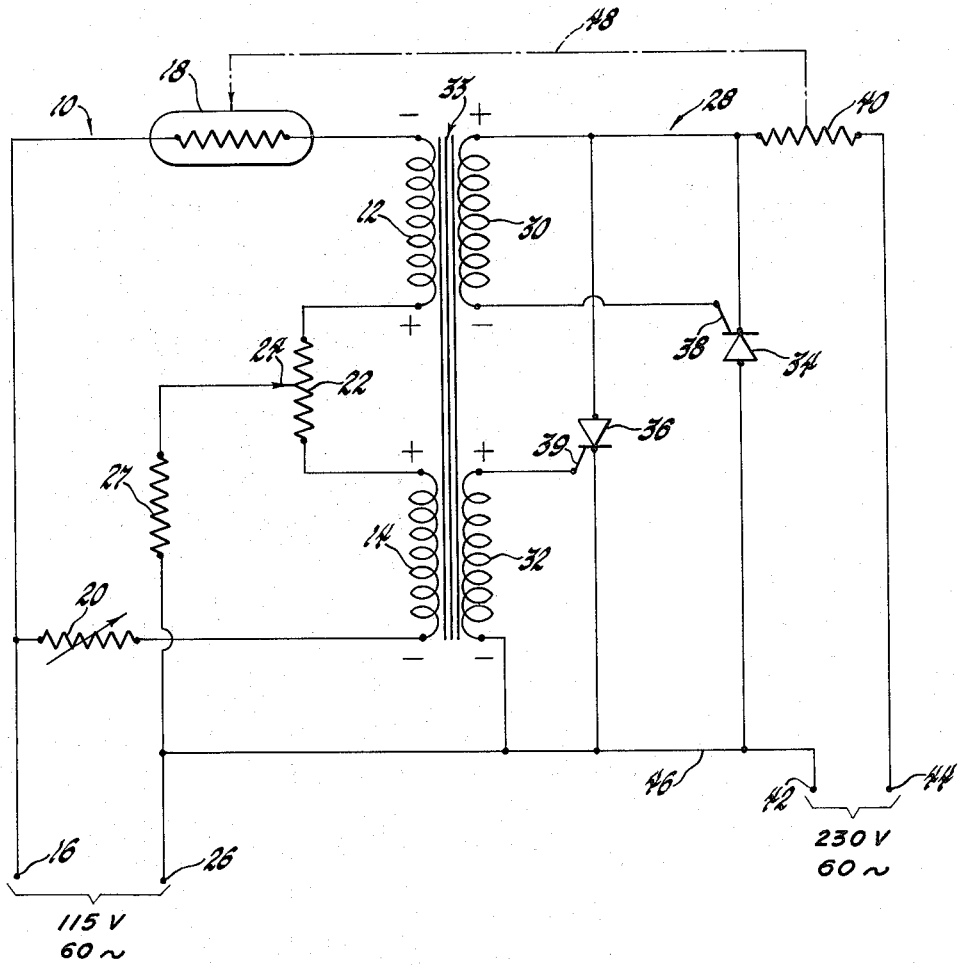
INVENTOR.
Raymond E. Summerer
BY
Paul J. Ethington
ATTORNEY United States Patent Office
3,259,832
Patented July 5, 1966

3,259,832
ELECTRICAL CONTROL DEVICE
Raymond E. Summerer, Grand Blanc, Mich., assignor to General Motors Corporation, Detroit, Mich., a corporation of Delaware
Filed Oct. 3, 1962, Ser. No. 228,129
7 Claims. (Cl. 323—4)

This invention relates to an electrical circuit for controlling the energization of a load device.

More particularly, the present invention provides a means for regulating the energization of a load device by means of a differential transformer arrangement wherein a pair of primary transformer coils are separately energizable and are connected to produce respective flux fields which are in mutual opposition. Magnetically linked to the primary coils is at least one secondary coil which is effective to have generated therein a signal which is dependent upon the net magnetic field produced by the primary field. At a predetermined net secondary signal value, a current-controlling device which is interconnected with the secondary coil is energized or enabled to apply a source of power to a load device.

In a preferred form of the invention, servo control of the load device may be accomplished by providing condition-sensitive means in circuit with one of the primary transformer coils, which means is responsive to a condition produced by the load device to regulate the value of the net magnetic field produced by the primary coils.

A more thorough understanding of the present invention may be obtained from the following detailed description which is to be taken in conjunction with the single figure showing a schematic representation of an illustrative embodiment of the present invention.

The figure shows an application of the present invention to a thermal control circuit such as may be embodied in an oven. In accordance with the invention, an input circuit, generally designated at 10, is shown comprising primary coils 12 and 14 which, upon suitable energization, are effective to produce respective flux fields which are in magnetic opposition. One end of coil 12 is interconnected with an input terminal 16 by means of a condition-responsive impedance element in the form of a thermistor 18. One end of coil 14 is similarly interconnected with terminal 16 by means of a variable resistor 20. The other ends of coils 12 and 14 are connected across a resistor 22. A contact member 24 is displaceable along and electrically associated with resistor 22. Contact member 24 is also interconnected with a second input terminal 26 by means of a current-limiting resistor 27. To energize the coils 12 and 14, a suitable A.C. supply source may be connected across terminals 16 and 26. The source is shown in the drawing as a 115 volt, 60 c.p.s. supply. The energizing circuit for coil 12, thus, comprises the 115 volt source, thermistor 18, the portion of resistor 22 as defined by the position of contact member 24 and the current-limiting resistor 27. Similarly, the energizing circuit for coil 14 comprises the 115 volt source, variable resistor 20, the remaining portion of resistor 22 and resistor 27. It can be seen that by varying the total resistance in series with coils 12 and 14, it is possible to independently vary the amount of magnetic flux produced by the coils. Thus it is possible to control the net magnetic field produced thereby.

An output circuit generally designated at 28, is shown comprising secondary coils 30 and 32 which are magnetically linked with the primary coils 12 and 14 as indicated at 33. It is to be understood that the secondary coils 30 and 32 may be wound on a single core and are jointly energized by the net magnetic field produced by the primary coils 12 and 14. As indicated by the polarity markings in the drawing, the signals induced in the secondary coils 30 and 32 are of the same polarity or sense while the signals induced in the primary coils 12 and 14 are opposite in polarity. Thus it may be seen that a potential difference equal to the signal induced in each of the secondary coils will exist across the outside ends of the coils as shown in the drawing. Similarly, the potential variations at the inside ends of the secondary coils 30 and 32 will be 180° out of phase in accordance with the net primary field.

Connected across the outside ends of coils 30 and 32 is a pair of current controlling devices in the form of silicon controlled rectifiers 34 and 36 which are adapted to conduct in opposite directions. The gate terminals 38 and 39 of the rectifiers are respectively connected to the inside ends of the coils 30 and 32. Due to the 180° phase relation mentioned above, the SCR's 34 and 36 will be alternately gated conductive in accordance with the alternations in the primary voltage. A load device in the form of a heater resistor 40 is connected in series with one of a pair of supply terminals 42 and 44 which are adapted to be connected to an A.C. supply source indicated as a 230 volt, 60 cycle per second supply. It will be seen that upon proper gating or enabling of the SCR's 34 and 36, a current path will be provided between the 230 volt source and the load resistor 40.

Referring to the figure in greater detail, it may be seen that supply terminal 42 is interconnected with input terminal 26 by means of conductor 46 so as to provide a common voltage reference between the 230 volt load supply and the 115 volt primary supply, as will become more apparent in the following. In a practical application, the 230 volt and 115 volt supplies may be conveniently provided by the common household electrical supply system. Additionally, the output circuit 28 will be understood to be thermally linked with the input circuit 10 by means of a thermal feedback path, diagrammatically indicated at 48, extending between load resistor 40 and thermistor 18. Accordingly, the temperature and resistance of thermistor 18 will be directly determined by the current through the heater resistor 40.

In operation, the variable resistor 20 is properly selected in value so as to provide a predetermined degree of heating from the resistor 40. Assuming that the resistor 40 is cold, there will be no thermal energy feedback to thermistor 18. Thus, thermistor 18 presents a high impedance to the 115 volt energizing source, and the current through primary coil 14 will be in excess of that through coil 12. Under these circumstances a net magnetic field will be produced in accordance with the difference between the fields produced by coils 12 and 14. Secondary coils 30 and 32 will be responsive to the net field produced by the primary coils 12 and 14 to generate a triggering signal which will be applied to the gate terminals 38 and 39 of SCR's 34 and 36, respectively. As long as the resistance in series with primary coil 12 is greater than the resistance in series with coil 14, there will exist an unbalanced condition in the primary fields. This primary unbalance will be effective to produce an alternating signal in the secondary coils 30 and 32. The alternating signal generated in coil 30 will be effective to periodically gate SCR 34 conductive to the energy from the 230 volt supply source. Similarly, SCR 36 will be periodically gated conductive by the signal generated in secondary coil 32. The frequency of the periodic conductive states of the SCR's 34 and 36 corresponds with the frequency of the 115 volt input supply connected to terminals 16 and 26, i.e., 60 cycles per second. Due to the common connection by means of conductor 46, the phase relation between the conductive periods of the SCR's and the voltage swings of the 230 volt source will be such that the proper SCR is conductive at the time the voltage from the 230 volt source is in condition to be conducted by that SCR. In the illustrative embodiment described herein, SCR's 34 and 36 are conductive when coil 14 is more highly energized than coil 12. If it is desired to reverse this relation, the phase relation between the signals from the 115 and the 230 volt supplies must be phase shifted 180°.

Accordingly, the voltage from the 230 volt source will be applied through load resistor 40 as long as a signal unbalance results from the primary coils 12 and 14. However, thermistor 18 which is thermally linked with resistor 40 by means of the feedback path 48, will soon increase in temperature and, thus, decrease in resistance. The decreasing resistance of thermistor 18 is effective to increase the energization of coil 12 until such time as the magnetic field produced by coil 12 effectively cancels that produced by coil 14. At this point, there being no net magnetic field, no signal will be generated in the secondary coils 30 and 32. Therefore, the SCR's 34 and 36 will not be rendered conductive to the 230 volt supply source. Accordingly, resistor 40 will cool to a predetermined temperature. The heat responsive thermistor 18 will cool correspondingly to once again unbalance the primary magnetic circuit. The periodic energizations of the load resistor 40 will be effective to produce a predetermined equilibrium temperature.

While the illustrative embodiment has been described with reference to a thermal control means, it will be apparent to those skilled in the art that resistor 40 is merely representative of a load device which is adapted to produce a specific condition upon energization thereof. Similarly, thermistor 18 is merely representative of an impedance element which is responsive to the condition produced by the load device. Therefore, while feedback path 48 is established by means of thermal energy in the present illustration, this feedback path may be taken to represent any suitable means for communicating the conditions produced by the output load device with the condition responsive impedance element in series with primary coil 12. Similarly, it will be understood that the SCR's 32 and 34 are representative of current-controlling devices having control terminals responsive to a predetermined input signal to become conductive across a pair of output terminals. Accordingly, the switching devices may take any number of forms as will be found suitable to the particular application of the present invention. It is, therefore, to be understood that many modifications and additions may be made to the illustrative figure without departing from the spirit and scope of the invention. For a definition of the invention, reference should be had to the appended claims.

I claim:

1. A circuit for controlling the power to a load device including: a pair of primary transformer coils connected to produce respective flux fields which are in effective opposition; the primary coils being adapted to be connected to a source of electrical energy; condition responsive means interconnected with one of the primary coils and effective to unbalance the energization of the coils; an output circuit comprising a secondary coil magnetically linked with the primary coils and adapted to be energized according to the net field produced by the primary coils, a load device effective to produce said condition when energized, and means responsive to a predetermined energization of the secondary coil to energize the load device.

2. A circuit for controlling the power to a load device including: a pair of primary transformer coils connected to produce respective flux fields which are in effective opposition, means to energize the primary coils, condition responsive means to unbalance the energization of the coils, a secondary coil magnetically linked with the primary coils and adapted to be energized according to the net magnetic field produced by the primary coils, a unidirectional current-controlling device having a control terminal adapted to control the current flow between a pair of output terminals in accordance with the signal appearing at the control terminal, a source of electrical energy connected across the output terminals, the control terminal being connected to the secondary coil and responsive to the energization thereof to render the controlling device conductive across the output terminals, the load being connected in series with the source and the controlling device.

3. A circuit for controlling the power to a load comprising, a pair of primary transformer coils connected to produce respective flux fields which are in effective opposition and adapted to be energized by a source of electrical energy, a condition sensitive impedance element connected in series with one of the primary coils whereby the flux fields produced by the primary coils may be unbalanced, a secondary coil magnetically linked with the primary coils and adapted to generate a signal which is related to the net field produced by the primary coils, a current-controlling device having a control terminal adapted to control the conductivity between two output terminals, the control terminal being connected to the secondary coil and responsive to a predetermined value of the signal generated therein to render the controlling device conductive, a source of electrical energy connected across the output terminals, the load being connected in series with the source and the controlling device, the condition sensitive impedance element being responsive to the energization of the load to vary the impedance in a sense tending to balance the flux fields produced by the primary coils.

4. A circuit for controlling the application of energy to a load comprising a pair of primary transformer coils connected to produce respective flux fields which are in effective opposition, means to energize the primary coils, a condition sensitive impedance element connected in series with one of the primary coils whereby the flux fields may be unbalanced, a pair of secondary coils magnetically linked with the primary coils and adapted to generate respective signals related to the net field produced by the primary coils, a pair of unidirectional current-controlling devices each having a control terminal adapted to control the conductivity between two output terminals, the control terminals being respectively connected to the secondary coils whereby the controlling devices are rendered conductive when a net primary field of predetermined magnitude exists, a source of alternating current, the controlling devices being oppositely connected in parallel across the series combination of the source and a load, the condition sensitive impedance element being operatively linked with the load and responsive to the energization thereof to vary the impedance in a sense tending to balance the flux fields produced by the primary coils.

5. A circuit as defined by claim 3 wherein the condition sensitive impedance element is a thermistor, the load is a heater resistor, and the thermistor and coil are in thermal contact.

6. A circuit as defined by claim 4 wherein the current-controlling devices are SCR's.

7. Servo control apparatus including: a pair of primary transformer coils connected to produce respective flux fields which are in effective opposition; means to energize the coils; condition sensitive means connected in circuit with one of the coils to vary the flux field produced thereby; a secondary coil magnetically linked with the primary coils to produce a signal related to the net field produced by the primary coils; an output circuit including a current-controlling device connected to the secondary coil and responsive to the secondary signal to become conductive, a load device, and a source of energy; the condition sensitive means being operatively linked with the load device and responsive to the energization thereof to tend to maintain equal energiaztion of thet primary coils.

References Cited by the Examiner
UNITED STATES PATENTS

| | | | |
|---|---|---|---|
| 3,040,156 | 6/1962 | McGlaughlin | 219—20 |
| 3,114,025 | 12/1963 | Blauvelt et al. | 219—20 |

FOREIGN PATENTS 825,083  12/1959  Great Britain.

JOHN F. COUCH, *Primary Examiner.*

LLOYD McCOLLUM, *Examiner.*

D. L. RAE, K. D. MOORE, *Assistant Examiners.*